United States Patent
Ma et al.

(10) Patent No.: US 7,009,931 B2
(45) Date of Patent: Mar. 7, 2006

(54) SYNCHRONIZATION IN A MULTIPLE-INPUT/MULTIPLE-OUTPUT (MIMO) ORTHOGONAL FREQUENCY DIVISION MULTIPLEXING (OFDM) SYSTEM FOR WIRELESS APPLICATIONS

(75) Inventors: Jianglei Ma, Ottawa (CA); Wen Tong, Ottawa (CA); Shiquan Wu, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 1056 days.

(21) Appl. No.: 09/751,881

(22) Filed: Dec. 29, 2000

(65) Prior Publication Data

US 2002/0122382 A1 Sep. 5, 2002

Related U.S. Application Data

(60) Provisional application No. 60/229,972, filed on Sep. 1, 2000.

(51) Int. Cl.
*H04J 11/00* (2006.01)

(52) U.S. Cl. .................. 370/208; 370/281; 370/344

(58) Field of Classification Search .............. 370/208, 370/516, 310, 902–905, 341, 342, 329–335, 370/437, 347; 375/371, 285–299, 346–349, 375/225–233, 260–265; 455/506, 423
See application file for complete search history.

(56) References Cited

U.S. PATENT DOCUMENTS

| | | | | |
|---|---|---|---|---|
| 6,473,467 B1 | * | 10/2002 | Wallace et al. | ............. 375/267 |
| 6,614,864 B1 | * | 9/2003 | Raphaeli et al. | ............ 375/371 |
| 6,700,865 B1 | * | 3/2004 | Yamamoto et al. | ......... 370/208 |

* cited by examiner

*Primary Examiner*—Kwang Bin Yao
*Assistant Examiner*—Prenell P Jones
(74) *Attorney, Agent, or Firm*—Mintz Levin Cohn Ferris Glovsky & Popeo

(57) ABSTRACT

Methods and apparatus are described for time synchronizing a receiver to orthogonal frequency division multiplexing (OFDM) signals in a multiple-input/multiple-output (MIMO) system, the signals being transmitted from multiple transmitters and received at multiple receivers. The method includes determining the frequency offset and the sampling clock offset of the received signals.

34 Claims, 5 Drawing Sheets

SYNCHRONIZATION IN A MULTIPLE-INPUT/MULTIPLE-OUTPUT (MIMO) ORTHOGONAL FREQUENCY DIVISION MULTIPLEXING (OFDM) SYSTEM FOR WIRELESS APPLICATIONS

RELATED APPLICATIONS

This application claims the priority of U.S. Provisional Application No. 60/229,972, filed Sep. 1, 2000.

FIELD OF THE INVENTION

This invention relates generally to the field of wireless data transmission and more specifically to methods and apparatus for synchronizing a receiver to a signal in a wireless system that utilizes multiple-input/multiple-output (MIMO), orthogonal frequency division multiplexing (OFDM).

BACKGROUND OF THE INVENTION

As Internet usage has increased, so has the need for fast, efficient transmission of Internet data. While there exists a plethora of data transmitting equipment, ranging from analog modems that transmit at 56 kilobits per second (kps) to Cable Modems that transmit at 10–30 megabits per second (mps), conventional systems have their drawbacks. For example, analog modems sacrifice speed for easy installation in a computer and use with an existing phone line. Cable Modems require special cables from a base station before they can be used. Some systems, like Cable Modems, have a further drawback that they are a shared transmission medium so that the rate of transmission decreases with the number of simultaneous users, e.g. neighbors who may also be on-line. Additionally, most conventional systems require a physical transmission line from the customer premise equipment (CPE) to a base station, be it a traditional telephone line or dedicated data line. It is therefore desirable to transmit data without requiring a physical line. However, present wireless devices, such as cellular telephones and pagers have a very limited ability to transmit and receive data.

To increase the capacity of wireless data transmission, Orthogonal Frequency Division Multiplexing (OFDM) may be used. OFDM is a modulation method, which encodes data onto a radio frequency (RF) signal. While conventional RF transmission schemes encode data symbols onto one radio frequency, OFDM encodes data symbols onto multiple frequencies or "sub-carriers." The high-speed data signal is divided into tens or hundreds of lower speed signals, dividing the data across the available spectrum into a set of sub-carriers. To prevent interference between the sub-carriers, each sub-carrier is orthogonal (independent or unrelated) to all the other sub-carriers, so that guard intervals are not needed around each sub-carrier but, rather, are needed only around a set of sub-carriers (at the edge of the occupied frequency band). Thus, OFDM systems are spectrally efficient and are much less susceptible to data loss due to multipath fading than conventional systems.

An alternative solution is a Multiple Input Multiple Output (MIMO) system which utilizes multiple independent transmitting antennas to communicate with multiple independent receiving antennas. MIMO systems can be used to either increase signal power or increase the data rate transmission. In one configuration, a MIMO system may operate in temporal diversity, i.e. where each transmitting antenna sends a data signal that is correlated to the data signal sent by another antenna. By combining the received signals, a stronger signal can be obtained. In another configuration, the MIMO system operates in spatial diversity, where each transmitting antenna sends a data signal that is independent to the data signal sent by another antenna. For every additional transmitting antenna that is used, the data rate increases proportionality, i.e. using two antennas doubles the data rate, using three antennas triples the data rate, etc.

Each of these methods has previously only been implemented independently. Therefore, designers of data transmission systems had to choose between the benefits of each system and determine which type of modulation method to implement. It would therefore be beneficial to provide the benefits of both OFDM and MIMO in a single system to provide wireless transmission of data.

Such a MIMO OFDM system would probably employ a robust time synchronization method in order to synchronize the multiple OFDM signals received at the multiple receiving stations. Since OFDM has thus far only been utilized in single-input/single-output (SISO) systems, current OFDM synchronization methods are of little value. It would therefore be beneficial to provide a robust time synchronization method for a MIMO OFDM system capable of synchronizing the multiple OFDM signals.

SUMMARY OF THE INVENTION

The present invention is directed to synchronizing a receiver to received data signals in a multiple-input/multiple-output (MIMO), orthogonal frequency division multiplexing (OFDM) system and to estimating frequency and sampling clock offsets in such a system.

According to an aspect of the invention, a method is provided for synchronization a receiver to a signal, which includes at least one preamble. The method includes receiving the signal at a receiver and determining a first starting position by applying a sliding correlator algorithm to the received signal. The method also includes finding a second starting position, subsequent to finding the first starting position, by matching at least one stored preamble to the received signal.

According to another aspect of the invention, an apparatus is provided. The apparatus includes a storage module for storing at least one preamble and a receiver module in electrical communication with the storage module. The receiver module is configured for receiving, multiple data frames, each of which includes at least one preamble and at least one symbol. The at least one symbol includes multiple samples. The apparatus also includes a first synchronization module for applying a sliding correlator algorithm to the data frames. The apparatus includes a second synchronization module for correlating a preamble in a data frame to the at least one preamble stored in the storage module.

According to yet another aspect of the invention, an apparatus is provided that includes a memory configured to store at least one preamble. The apparatus also includes a receiver configured to receive multiple data frames, each of which includes at least one preamble and at least one symbol. The symbol includes multiple samples. The apparatus also includes a sliding correlator, in electrical communication with the receiver, that is configured to apply a first synchronization algorithm to the data frames. The apparatus employs a correlating synchronizer that is configured to apply a second synchronization algorithm to the data frames by correlating a preamble in a single data frame to a preamble stored in the memory.

According to still another aspect of the invention, a method is provided that includes receiving multiple data signals at multiple receivers over multiple MIMO channels. Each of the MIMO channels has multiple sub-carrier channels, and each of the sub-carrier channels has identical sub-carrier spacing. The data signals each include at least one preamble and at least one symbol, and the at least one symbol includes multiple samples. The method includes separating, at one of the receivers, one of the signals from the other received signals. It also includes separating, at another of the receivers, another of the received signals. Each of the receivers respectively determines a course starting position by applying a sliding correlator to the separated signals. Each of the receivers also respectively determines another starting position by traversing the separated signals from the respective course starting positions and comparing at least one stored preamble to the separated signals until the stored preamble matches the separated signal in at least one of the receivers.

The invention will next be described in connection with certain illustrated embodiments and practices. However, it will be clear to those skilled in the art that various modifications, additions and subtractions can be made without departing from the spirit or scope of the claims.

DETAILED DESCRIPTION OF THE INVENTION

Figure 1:
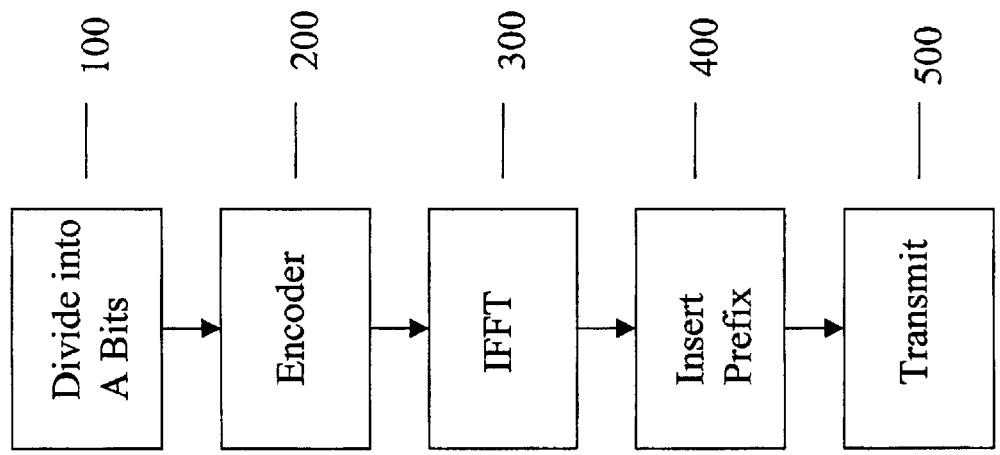
FIG. 1 is a flow diagram illustrating the steps of a typical OFDM transmission.

FIG. 1 illustrates an OFDM transmission in a single-input/single-output (SISO) system.

Referring to FIG. 1, a set of bits are to be transmitted via a radio-frequency (RF) transmission to a receiving location. The set of bits is divided into segments of A bits at step 100 and input into an encoder every $T_p+T_s$ seconds at step 200, where $T_s$ is an OFDM symbol interval, and $T_p$ is a cyclic prefix or guard interval. The encoder then sub-divides the A bits into N sub-segments of m bits. For example, a stream of bits that is to be transmitted may be input into the encoder in segments of 1024 bits. The encoder then divides the 1024 bits into 256 sub-segments of 4 bits each. Thus, in this example, A=1024, m=4, N=256. These numbers are illustrative only and are not intended to limit the scope of the invention.

An OFDM transmission may employ N+1 sub-carriers, including a zero frequency DC sub-carrier that is not used to transmit data. The encoder may further perform a modulation, such as a quadrature amplitude modulation (QAM), so that each N sub-segment of m bits has a corresponding complex valued sub-symbol $c_k=a_k+jb_k$, where $-N/2 \leq k \leq N/2$. This provides a sequence of N frequency domain sub-symbols that encodes all the data bits.

After encoding, an inverse fast Fourier transform (IFFT) is carried out on the sequence of N sub-symbols at step 300.

The IFFT uses each of sub-symbols, $c_k$, to modulate the phase and amplitude of a corresponding one of N+1 sub-carrier frequencies over the symbol interval $T_s$. The sub-carriers may be given by $e^{-2\pi j f_k t}$ and therefore have baseband frequencies of $f_k=k/T_s$ where k is the frequency number and an integer within $-N/2 \leq k \leq N/2$. The IFFT produces a digital time-domain OFDM symbol of duration $T_s$ given by the relation:

$$u(t) = \sum_{k=-N/2}^{N/2} c_k \exp(-2\pi j f_k t), \text{ where } 0 \leq t \leq T_s.$$

The modulation of the OFDM sub-carriers by frequency-domain sub-symbols over symbol intervals of $T_s$ seconds results in the OFDM sub-carriers each having a $$\frac{\sin x}{x}$$

spectrum in the frequency domain. By spacing the N+1 sub-carriers $1/T_s$ in the frequency domain, the peak of each sub-carrier's $$\frac{\sin x}{x}$$

spectrum coincides with a minimum of the spectrum of every other sub-carrier. Thus, although the sub-carriers may overlap, they are orthogonal to each other.

The digital time domain OFDM symbols produced by IFFT are then passed to a digital signal processor (DSP) which may add a cyclic prefix or guard interval of length $T_p$ to each OFDM symbol at step 400. The cyclic prefix may be a repetition of part of the symbol or some other prefix. The cyclic prefix prevents interference between consecutively transmitted OFDM symbols.

After adding the prefix, the information is transmitted, as shown at 500, via a channel having a minimum channel bandwidth of $(1/T_s)*(N+1)$ Hz, so as to accommodate all the OFDM sub-carriers. The OFDM data is typically transmitted in data frames composed of multiple symbols at a transmission rate determined by a sampling clock. For example, a data frame may have 100 symbols, each symbol being 6000 samples, as a function of the sampling rate of the sampling clock. These numbers are illustrative only and are not intended to limit the scope of the invention.

The OFDM data frames are transmitted serially by a RF transmitter, which may include an IF band-pass filter, a RF mixer, a local oscillator, a RF band-pass filter, a RF power amplifier, and an antenna.

The OFDM data frames are then received by an OFDM receiver that includes a RF receiver, which may include an antenna, a low noise amplifier, a RF band-pass filter, an automatic gain control circuit, a RF mixer, a RF carrier frequency local oscillator, and an IF band-pass filter. The received data frames are then delivered to an OFDM receiving system which: a) synchronizes the receiver to the timing of the symbols and data frames; b) estimates and corrects for the carrier frequency offset; c) removes the cyclic prefixes from the received OFDM signal; and d) computes a fast Fourier transform (FFT) in order to recover the sequences of frequency-domain sub-symbols. The system may also estimate and correct the sampling clock offset.

The MIMO-OFDM system of the present invention uses two or more RF transmitters and two or more receivers.

These transmitters may be located in the same base station or in multiple base stations. The receivers may also be located in the same receiver station or multiple receiver stations.

Because the receiving stations may begin to operate after the transmitting stations begin transmitting, the first signal received at the receivers may not be the first signal transmitted by the transmitters. In such circumstances synchronization is performed to determine the appropriate start and end points of the transmitted data stream.

Preambles are periodically inserted into the OFDM data frames prior to serial transmission. For example, a preamble may be inserted every 2.5 ms, every 5 ms, etc. Each data frame transmitted from an OFDM transmitter is defined by a sequence, such as "preamble symbol, data symbol, preamble symbol, data symbol, etc . . . " or "preamble, symbol, data symbol, data symbol, preamble, symbol, data symbol, data symbol, etc." The sequence may depend on the real environment and is not limited to those sequences illustrated.

A description of the preambles and how they are designed is set out in U.S. application Ser. No. 09/751,879 entitled "Preamble Design for Multiple-Input Multiple Output (MIMO) Orthogonal Frequency Division Multiplexing (OFDM) System", filed concurrently herewith, which is incorporated herein by reference. As noted in application Ser. No. 09/751,879, the preamble may contain training symbols and pilots.

Figure 2:
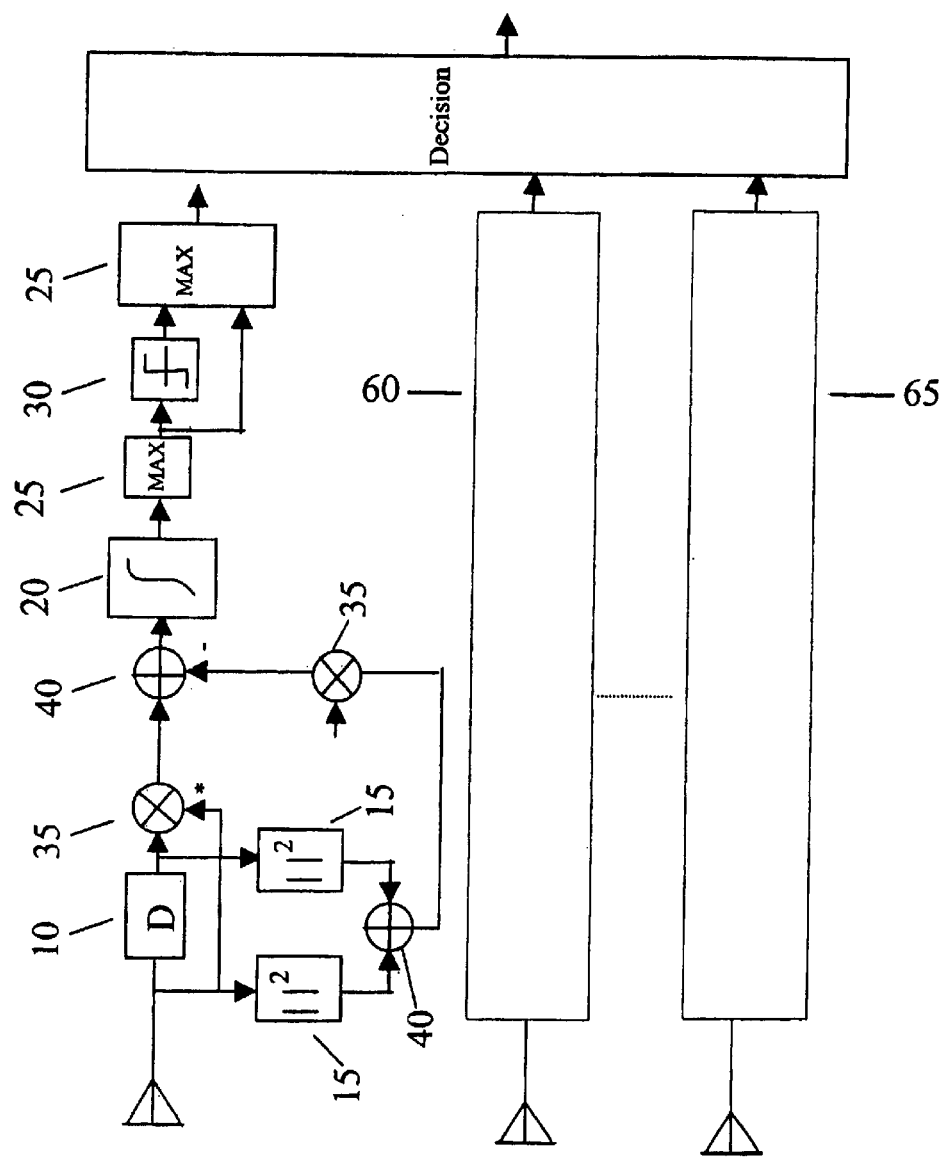
FIG. 2 illustrates a block diagram of a coarse synchronization apparatus in accordance with an embodiment of the invention.
Figure 3:
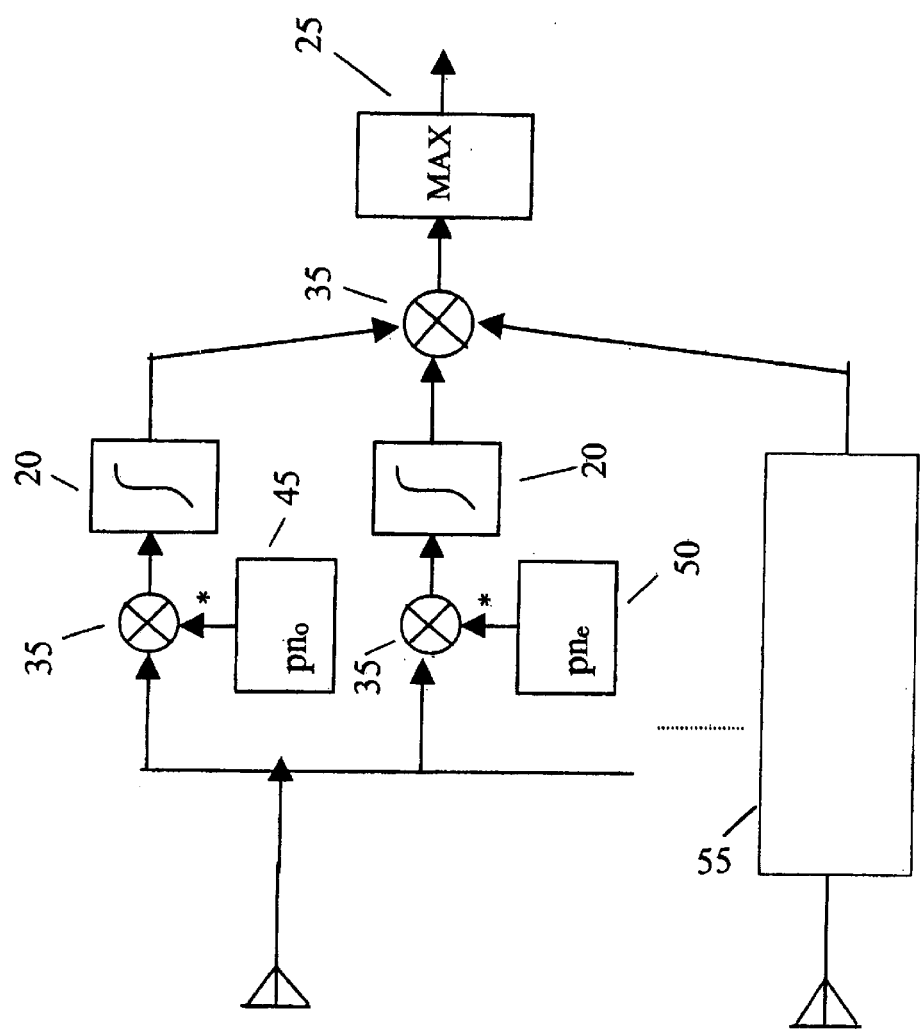
FIG. 3 illustrates a block diagram of a fine synchronization apparatus in accordance with an embodiment of the invention.

The synchronization, namely the process whereby the starting and ending points of the transmitted data are determined, is carried out in two stages (FIGS. 2 and 3). A processor may perform mathematical calculations in each stage. The first stage is a coarse synchronization (FIG. 2), whereby a rough estimate of the starting point of the preamble is determined. The coarse synchronization is conducted by using a sliding correlator. For example, a simple, sliding, correlator, for the coarse synchronization stage, may be defined by the relation:

$$\Lambda^i(x) = \left| \sum_{l=0}^{N_{symbol}-1} r_t^i(x+l) r_t^{i*} \right.$$

$$\left. \left( x + N_{symbol} + l \right) \right| - \rho/2 \sum_{l=0}^{N_{symbol}-1} [|r_t^i(x+l)|^2 + $$

$$|r_t^i(x+N_{symbol}+l)|^2]$$

$$\rho = \frac{SNR+1}{SNR}$$

$$x_{coarse}^i = \arg\max(\Lambda^i(x))|(\arg\max(\Lambda^i(x))>le)$$

In the equations listed above, $\Lambda^i(x)$ is the index (e.g., the starting position), $r_t^i$ is the received signal (from ith receiver antenna), $r_t^{i*}$ is the conjugate of the received signal, SNR is signal-to-noise ratio, $N_{sample}$ is the number of samples in one OFDM symbol, and le is the threshold. Because the SNR may not be known at the receiving end, a fixed SNR (for example SNR=4 dB) may be assumed on the initial synchronization. The coarse synchronization method provides a starting position $\Lambda^i(x)$ from which to commence fine synchronization.

FIG. 2 illustrates a block diagram of the logic used to perform the course synchronization. This can be performed by an application specific integrated circuit (ASIC), by a microprocessor, or some other processor. As illustrated in FIG. 2, the apparatus includes delay 10, multipliers 35, summers 40, absolute value squared 15, integral 20, summation 30 and maximum value selector 25. As illustrated, by the blank boxes, the same circuitry or logic may be duplicated.

In a MIMO-OFDM system, the OFDM frame boundaries for all transmit antennas may be aligned. As such, an identical coarse synchronization process may occur at each receiver. The coarse synchronization process may be declared completed if at least one receiver successfully acquires the frame.

The fine synchronization process (FIG. 3) uses one or more preambles stored in a memory, and matches the stored preamble(s) to the transmitted preamble(s). From the starting point determined by the coarse synchronization and traversing forward and/or backward along the data stream, the encountered preambles are compared to the stored preamble by computing a correlation until a complete match is found. FIG. 3 illustrates a block diagram of the logic employed to perform this fine synchronization. This too can be realized by an application specific integrated circuit (ASIC), by a microprocessor, or some other processor. As illustrated in FIG. 3, the apparatus includes even pn codes 50, odd pn codes 45 multipliers 35, integral 20, and maximum value selector 25. As illustrated, by the blank boxes, the same circuitry or logic may be duplicated.

Pseudo noise (PN) pilots in the training symbols of the preamble are typically used to conduct fine synchronization, in either the time domain or in the frequency domain. The final synchronization position is determined based on the correlation results from all MIMO channels. The MIMO structure can further enhance the fine synchronization and is robust to multi-path fading. The joint decision is made based on the separated MIMO channel correlators by counting the product of all the receive antennas correlators outputs. For example, assuming that there are two transmitting antennas and two receiving antennas so that there are 2×2 MIMO channels, the correlation functions for fine synchronization in the time domain are defined by the relations:

$$\Lambda_{o,i}(x) = \left| \sum_{l=0}^{\frac{N_{fft}}{2}} \left[ r_t^i(x+l) + r_t\left(x + \frac{N_{fft}}{2} + l\right) + \right. \right.$$

$$\left. \left. r_t(x+N_{symbol}+l) + r_t\left(x + N_{symbol} + \frac{N_{fft}}{2} + l\right) \right] pn_o^*(l) \right|$$

$$\Lambda_{e,i}(x) = \left| \sum_{l=0}^{\frac{N_{fft}}{2}} \left[ r_t(x+l) - r_t\left(x + \frac{N_{fft}}{2} + l\right) + r_t(x+N_{symbol}+l) - \right. \right.$$

$$\left. \left. r_t\left(x + N_{symbol} + \frac{N_{fft}}{2} + l\right) \right] pn_e^*(l) \right|$$

($i = 1$ represents Rx antenna 1 and $i = 2$ refers to Rx antenna 2)

$$pn_o = IFFT(PN_o)$$

$$pn_e = IFFT(PN_e)$$

$$\Lambda_2 = \Lambda_{o,1}\Lambda_{o,2}\Lambda_{e,1}\Lambda_{e,2}$$

$$x_{fine} = \arg\max(\Lambda_2(x)),$$

where $$x \in [x_{coarse} - N_{fine}, x_{coarse} + N_{fine}].$$

In the above equations, $PN_o$ and $PN_e$ are the known PN codes used for respectively modulating odd indexed pilots, i.e. for Tx antenna 1 and the even indexed pilots i.e. for Tx antenna 2 in the training symbols of the preamble. $N_{fft}$ is FFT size. $N_{fine}$ is the number of samples to be searched backwards and forwards around the starting position obtained from the coarse synchronization. The property of time domain, training symbol structures for different transmitting antennas has been used in the above equations to reduce the interference from other channels. Further, the decision statistic $\Lambda_2$ is an optimal detector for MIMO-OFDM synchronization.

Timing may be tracked by repeating the second timing synchronization step for several frames. Once the timing synchronization is reached, the frequency and sampling clock offsets may be estimated and corrected.

It is beyond current technology to manufacture oscillators that are identical. Therefore, the RF carrier frequency oscillator in the RF transmitter is not identical to the RF carrier frequency oscillator in the RF receiver. This mismatch between oscillators results in a frequency offset which causes a loss of orthogonality between the OFDM sub-carriers and results in inter-carrier interference between sub-carriers as well as a large increase in the bit error rate (BER) of the recovered data at the receiver. For the same reason, the clock sampling rate at the OFDM transmitter is not identical to the clock sampling rate at the OFDM receiver which creates a sampling clock offset, that adds to the frequency offset. Both the frequency offset and the sampling clock offset are corrected prior to extracting data from the samples received.

Figure 4:
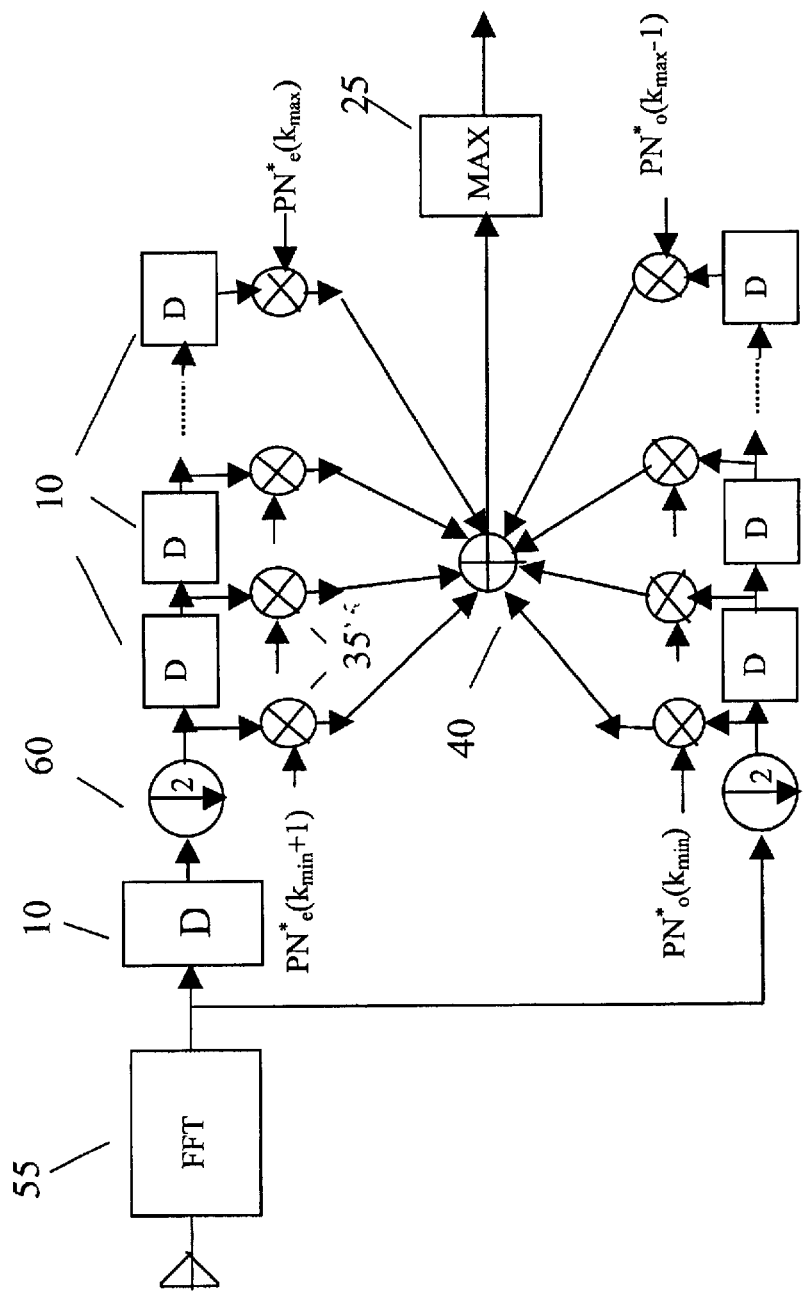
FIG. 4 illustrates a block diagram of multiple sub-carrier, spacing offset estimation apparatus in accordance with an embodiment of the invention.
Figure 5:
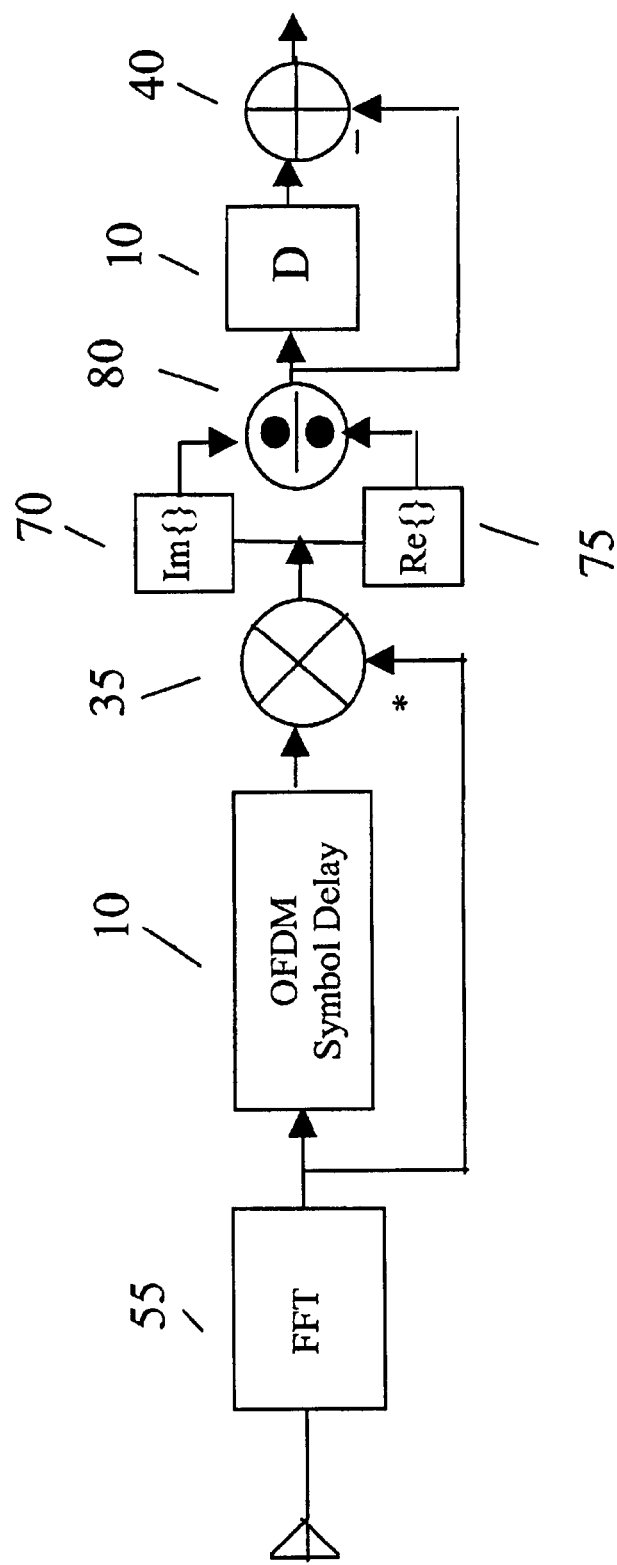
FIG. 5 illustrates a block diagram of a sampling clock/fractional sub-carrier spacing offset apparatus in accordance with an embodiment of the invention.

The frequency offset is divided into two parts (FIGS. 4 and 5). The first part is defined as a multiple of the sub-carrier spacing ($\delta f_{int}$). The second part is defined as a fraction of the sub-carrier spacing ($\delta f_{frac}$). The total frequency offset ($\delta f$) is thus represented by the following equations:

$$\delta f = \delta f_{int} + \delta f_{frac},$$

$$\delta f_{int} = Q \Delta f, \text{ and}$$

$$\delta f_{frac} = \epsilon \Delta f.$$

Here, Q is an integer, $\epsilon$ is a fraction, and $\Delta f$ is the sub-carrier spacing. Since $\delta f_{int}$ may cause a shift of all the sub-carriers, it may be found by finding the shift of the pilot sub-carrier indices (Z)(FIG. 4). The following equation is provided for a system having two transmitting antennas and two receiving antennas:

$$\Lambda_{i,j}(k) = \sum_{l=0}^{N_{tone}} R_{train}(k+l) PN_i^*(k\min + l), \text{ where}$$

$$(i, j = 1, 2),$$

$$Z = \arg \max(\Lambda_{i,j}(k)) - k_{min}.$$

In the above equations, $R_{train}$ is the received training symbol in the frequency domain, $k_{min}$ is the index of the first useful sub-carrier, $k_{max}$ is the last useful sub-carrier, and $PN_i$ are the known PN codes used by Tx antenna 1 (i=1) and Tx antenna 2 (i=2) respectively. $N_{max}$ is a value obtained from the expected maximum frequency offset and is based on the precision of the reference frequency. FIG. 4 illustrates in block diagram form, the logic employed to perform this offset estimation. This too can be performed by an ASIC, by a microprocessor, or some other processor. As illustrated in FIG. 4, the apparatus includes delay 10, multipliers 35, a summer 40, decimator 60, fast Fourier transform 55, even pn codes 50, odd pn codes 45 and maximum value selector 25.

The fractional frequency offset and the sampling clock offset can be concurrently estimated (FIG. 5) by using two identical training symbols, $R_{train1}$ and $R_{train2}$ in the frequency domain, that are received successively. The following correlation may exist:

$$\Lambda(l) = \text{angle}(R_{train1}(l) R^*_{train2}(l))$$

The sampling clock offset may be obtained from the slope of the curve. Furthermore, the fractional frequency offset may be obtained from the values and the slope of the curve. FIG. 5 illustrates a block diagram of logic that may be employed to perform the estimation. This can be performed by an ASIC, by a microprocessor, or some other processor. As illustrated in FIG. 5, the apparatus includes delay 10, multiplier 35, summer 40, fast Fourier transform 55, Imaginary portions 70, real portions 75, and divider 80.

The respective offsets may be estimated for each MIMO channel. The final frequency offset and sampling clock offset estimations may then be determined by averaging the results obtained from the different MIMO channels.

The tracking of the frequency offset and sampling clock offset is achieved by using continual pilots. After the offsets have been estimated and corrected and the FFT window has been determined, a Fast Fourier Transform may be performed on each framed OFDM sample vector, again converting the value into complex-valued sub-symbols in the frequency domain. These complex valued sub-symbols may be used to decode the original A bits of data.

The following claims are intended to cover all of the generic and specific features of the invention described herein, and all statements of the scope of the invention which, as a matter of language, might be said to fall there between.

Having described the invention, what is claimed is:

1. In a multiple-input/multiple-output (MIMO), orthogonal frequency division multiplexing (OFDM) system, a method of synchronization a receiver to a signal, which includes at least one preamble, said method comprising:

receiving said signal at a receiver;

determining a first starting position by applying a sliding correlator algorithm to said received signal; and subsequent to finding said first starting position, finding a second starting position by matching at least one stored preamble to said received signal.

2. The method according to claim 1 wherein said sliding correlator is defined by the following relations:

$$\Lambda^i(x) = \left| \sum_{l=0}^{N_{symbol}-1} r_t^i(x+l) r_t^{i*}(x+N_{symbol}+l) \right| - \rho/2$$

$$\sum_{l=0}^{N_{symbol}-1} \left[ |r_t^i(x+l)|^2 + |r_t^i(x+N_{symbol}+l)|^2 \right] \text{ where}$$

$$\rho = \frac{SNR+1}{SNR};$$

$X_{coarse}^i = \arg \max(\Lambda^i(x)) | (\arg \max(\Lambda^i(x)) > 1e);$ $r_t^i$ is the received signals (from ith receiver antenna);

$r_t^*$ is the conjugate of the received signal;

SNR is signal-to-noise ratio;
$N_{sample}$ is the number of plurality of samples in one OFDM symbol; and,
le is a threshold value.

3. The method according to claim 1 wherein said matching is performed using algorithms defined by the relations:

$$\Lambda_{o,i}(x) = \left| \sum_{l=0}^{\frac{N_{fft}}{2}} \left[ r_t^i(x+l) + r_t\left(x + \frac{N_{fft}}{2} + l\right) + \right. \right.$$

$$\left. \left. r_t(x+N_{symbol}+l) + r_t\left(x+N_{symbol}+\frac{N_{fft}}{2}+l\right) \right] pn_o^*(l) \right|$$

and $$\Lambda_{e,i}(x) = \left| \sum_{l=0}^{\frac{N_{fft}}{2}} \left[ r_t(x+l) - r_t\left(x + \frac{N_{fft}}{2} + l\right) + \right. \right.$$

$$\left. \left. r_t(x+N_{symbol}+l) - r_t\left(x+N_{symbol}+\frac{N_{fft}}{2}+l\right) \right] pn_e^*(l) \right|$$

where
j=1 represents a first receiving antenna and j=2 represents a second receiving antenna;
$pn_o$ =IFFT($PN_o$);
$pn_e$ =IFFT($PN_e$);
$\Lambda_2 = \Lambda_{o,1}\Lambda_{o,2}\Lambda_{e,1}\Lambda_{e,2}$;
$X_{fine}$ =arg max($\Lambda_2(x)$);
$X \in [X_{coarse}-N_{fine}, X_{coarse}+N_{fine}]$;
$PN_o$ is a known Prime Number (PN) code used to modulate odd-indexed pilots;
$PN_e$ is a known Prime Number (PN) code used to module even-indexed pilots;
$N_{fft}$ is FFT size; and,
$N_{fine}$ is a number of samples to be searched backwards and forwards around the starting position obtained from a prior synchronization.

4. The method according to claim 1 wherein said matching at least one stored preamble to said received signal includes matching a plurality of stored preambles to said received signal.

5. The method according to claim 1 wherein said receiver includes a plurality of receivers;
each of said plurality of receivers respectively receives said signal from a respective transmitter; and,
each of said plurality of receivers determines a respective first starting position by applying said sliding correlator algorithm to said received signal.

6. The method according to claim 5 wherein:
said MIMO OFDM system includes a plurality of MIMO channels;
each of said MIMO channels has a plurality of sub-carrier channels; and,
each of said sub-carrier channels has identical sub-carrier spacing, the method further comprising:
calculating a frequency offset for a multiple of the sub-carrier spacing for each of the plurality of MIMO channels;
calculating a frequency offset for a fraction of the sub-carrier spacing for each of the plurality of MIMO channels;
calculating a total frequency offset for each of said MIMO channels by summing said frequency offset for a multiple of the sub-carrier spacing for each MIMO channel with said frequency offset for a fraction of the sub-carrier spacing for each MIMO channel; and,
determining an average frequency offset for said plurality of MIMO channels by averaging the total frequency offset of each MIMO channel.

7. The method according to claim 6 wherein said calculating a frequency offset for a multiple of the sub-carrier spacing for each of the plurality of MIMO channels further comprises calculating a shift of a pilot sub-carrier index for each preamble in the received signal.

8. The method according to claim 7 wherein said calculating the shift of the pilot sub-carrier index is determined by the relations:

$$\Lambda_{i,j}(k) = \sum_{l=0}^{N_{tone}} R_{train}(k+l)PN_i^*(k_{min}+l), \text{ where}$$

$(i, j = 1, 2)$;

$l \in [-N_{max}, N_{max}]$;
$Z = \arg \max(\Lambda_{i,j}(k)) - k_{min}$;
$R_{train}$ is a received training symbol in frequency the domain;
$K_{min}$ is an index of the first useful sub-carrier;
$PN_i$ are known PN codes used by the transmitters; and
$N_{max}$ is a value obtained from the expected maximum frequency offset.

9. The method according to claim 6 wherein said calculating the frequency offset of a fraction of the sub-carrier spacing further comprises correlating two identical training symbols.

10. The method according to claim 6 further comprising calculating a sampling clock offset by correlating two identical training symbols.

11. The method according to claim 6 wherein said determining the frequency offset of a fraction of the sub-carrier spacing for each of the plurality of MIMO channels includes calculating values of and a slope of a curve defined by the relation:

$$\Lambda(l) = \text{angle}(R_{train1}(l)R^*_{train2}(l));$$

where $R_{train}$ represents training symbols.

12. The method according to claim 10 wherein said calculating said sampling clock offset includes calculating a slope of a curve defined by the relation:

$$\Lambda(l) = \text{angle}(R_{train1}(l)R^*_{train2}(l)).$$

13. Apparatus for synchronization in a multiple-input/multiple-output (MIMO), orthogonal frequency division multiplexing (OFDM) system, a receiver to a received signal, said apparatus comprising:
storage means for storing at least one preamble;
receiver means coupled to said storage means, for receiving, a plurality of data frames, wherein each of said data frames includes at least one preamble and at least one symbol, and wherein said symbol includes a plurality of samples;
first synchronization means for applying a sliding correlator algorithm to said plurality of data frames; and,
second synchronization means for correlating a preamble in a data frame to said at least one preamble stored in said storage means.

14. The apparatus according to claim 13 wherein said sliding correlator is defined by the following relations:

$$\Lambda^i(x) = \left| \sum_{l=0}^{N_{symbol}-1} r_t^i(x+l) r_t^{i*}(x+N_{symbol}+l) \right| - \rho/2$$

$$\sum_{l=0}^{N_{symbol}-1} \left[ |r_t^i(x+l)|^2 + |r_t^i(x+N_{symbol}+l)|^2 \right];$$

where $$\rho = \frac{SNR+1}{SNR};$$

$X_{coarse}^i = \arg\max(\Lambda^i(x)) | (\arg\max(\Lambda^i(x)) > le)$;
$r_t^i$ is the received signals (from ith receiver antenna);
$r^*_t$ is the conjugate of the received signal;
SNR is signal-to-noise ratio;
$N_{sample}$ is the number of plurality of samples in one OFDM symbol; and
le is a threshold value.

15. The apparatus according to claim 13 wherein said second synchronization means is configured to perform in accordance with the relations:

$$\Lambda_{o,i}(x) = \left| \sum_{l=0}^{\frac{N_{fft}}{2}} \left[ r_t^i(x+l) + r_t\left(x + \frac{N_{fft}}{2} + l\right) + \right. \right.$$

$$\left. \left. r_t(x+N_{symbol}+l) + r_t\left(x+N_{symbol} + \frac{N_{fft}}{2} + l\right) \right] pn_o^*(l) \right|; \text{ and}$$

$$\Lambda_{e,i}(x) = \left| \sum_{l=0}^{\frac{N_{fft}}{2}} \left[ r_t(x+l) - r_t\left(x + \frac{N_{fft}}{2} + l\right) + r_t(x+N_{symbol}+l) - \right. \right.$$

$$\left. \left. r_t\left(x+N_{symbol} + \frac{N_{fft}}{2} + l\right) \right] pn_e^*(l) \right|;$$

where
j=1 represents a first receiving antenna and j=2 represents a second receiving antenna;
$pn_o$=IFFT($PN_o$);
$pn_e$=IFFT($PN_e$);
$\Lambda_2 = \Lambda_{o,1} \Lambda_{o,2} \Lambda_{e,1} \Lambda_{e,2}$;
$X_{fine} = \arg\max(\Lambda_2(x))$;
$X \in [X_{coarse} - N_{fine}, X_{coarse} + N_{fine}]$;
$PN_o$ is a known Prime Number (PN) code used to modulate odd-indexed pilots;
$PN_e$ is a known Prime Number (PN) code used to module even-indexed pilots;
$N_{fine}$ is a number of samples to be searched backwards and forwards around the starting position obtained from a prior synchronization.

16. The apparatus according to claim 13 wherein said preamble further includes at least one pilot sub-carrier having an index and at least one training symbol;
the system further including:
calculating means for calculating a frequency offset for a multiple of the sub-carrier spacing for each of the plurality of MIMO channels;
means for calculating a frequency offset for a fraction of the sub-carrier spacing for each of the plurality of MIMO channels;
summing means for calculating a total frequency offset for each of said MIMO channels by summing said frequency offset of a multiple of the sub-carrier spacing for each MIMO channel with the frequency offset of a fraction of the sub-carrier spacing for each MIMO channel; and
averaging means for determining the average frequency offset for said plurality of MIMO channels by averaging the total frequency offsets of each MIMO channel.

17. The apparatus according to claim 16 wherein said calculating means further comprises means for calculating a shift of the pilot sub-carrier index for each of the preambles in the plurality of data frames.

18. The apparatus according to claim 17 wherein said means for calculating the shift of the pilot sub-carrier index for each of the preambles in the plurality of data frames is configured to operate in accordance with the relations:

$$\Lambda_{i,j}(K) = \sum_{l=0}^{N_{tone}} R_{train}(k+l) PN_t^*(k_{min}+l), \text{ where } (i,j=1,2);$$

$l \in [-N_{max}, N_{max}]$;
$Z = \arg\max(\Lambda_{i,j}(K)) - k_{min}$;
$R_{train}$ is a received training symbol;
$K_{min}$ is an index of the first useful sub-carrier;
$PN_i$ are known PN codes used by the transmitters; and
$N_{max}$ is a value obtained from the expected maximum frequency offset.

19. The apparatus according to claim 17 wherein said means for calculating the frequency offset of a fraction of the sub-carrier spacing for each of the plurality of MIMO channels further comprises means for correlating two identical training symbols.

20. The apparatus according to claim 16 further comprising means for calculating a sampling clock offset by correlating two identical training symbols.

21. The apparatus according to claim 16 wherein said means for determining the frequency offset of a fraction of the sub-carrier spacing for each of the plurality of MIMO channels is configured to calculate values of and a slope of a curve defined by the relation:

$$\Lambda(l) = \text{angle}(R_{train1}(l) R^*_{train2}(l)),$$

where
$R_{train}$ represents training symbols.

22. The apparatus according to claim 20 wherein said means for calculating said sampling clock offset is configured to calculate a slope of a curve defined by the relation:

$$\Lambda(l) = \text{angle}(R_{train1}(l) R^*_{train2}(l)).$$

23. Apparatus for synchronization, in a multiple-input/multiple-output (MIMO), orthogonal frequency division multiplexing (OFDM) system, a receiver to a received signal, said apparatus comprising:
a memory configured to store at least one preamble;
a receiver configured to receive a plurality of data frames;
wherein each of said frames includes at least one preamble and at least one symbol, said symbol including a plurality of samples;
a sliding correlator coupled to said receiver configured to apply a first synchronization algorithm to said data frames; and a correlating synchronizer for applying a second synchronization algorithm to said data frames by correlating a preamble in a single data frame to a preamble stored in said memory.

24. The apparatus of claim 23 wherein said sliding correlator operates in accordance with the relations:

$$\Lambda'(x) = \left| \sum_{l=0}^{N_{symbol}-1} r'_t(x+l) r_t^{j*}(x+N_{symbol}+l) \right| -$$

$$\rho/2 \sum_{l=0}^{N_{symbol}-1} \left[ |r_t^j(x+l)|^2 + |r_t^j(x+N_{symbol}+l)|^2 \right]; \text{ where}$$

$$\rho = \frac{SNR+1}{SNR};$$

$X_{coarse}{}^i = \arg \max(\Lambda^i(x))|(\arg \max(\Lambda^i(x))>le)$;

$r_t$ is the received signal;

$r^*_t$ is the conjugate of the received signal;

SNR is signal-to-noise ratio;

$N_{sample}$ is the number of plurality of samples in one OFDM symbol; and, le is a threshold value.

25. The apparatus of claim 21 wherein said correlating synchronizer is defined by the relations:

$$\Lambda_{o,i}(x) = \left| \sum_{l=0}^{\frac{N_{\mathit{fft}}}{2}} \left[ r_t^j(x+l) + r_t\left(x + \frac{N_{\mathit{fft}}}{2} + l\right) + \right. \right.$$

$$\left. \left. r_t(x+N_{symbol}+l) + r_t\left(x+N_{symbol}+\frac{N_{\mathit{fft}}}{2}+l\right) \right] pn_o^*(l); \text{ and} \right.$$

$$\Lambda_{e,i}(x) = \left| \sum_{l=0}^{\frac{N_{\mathit{fft}}}{2}} \left[ r_t(x+l) - r_t\left(x + \frac{N_{\mathit{fft}}}{2} + l\right) + r_t(x+N_{symbol}+l) - \right. \right.$$

$$\left. \left. r_t\left(x+N_{symbol}+\frac{N_{\mathit{fft}}}{2}+l\right) \right] pn_e^*(l); \right.$$

where j=1 represents a first receiving antenna and j=2 represents a second receiving antenna;

$pn_o$=IFFT($PN_o$);

$pn_e$=IFFT($PN_e$)

$\Lambda_2 = \Lambda_{o,1} \Lambda_{o,2} \Lambda_{e,1} \Lambda_{e,2}$;

$X_{fine} = \arg \max(\Lambda(x))$;

$X \in [X_{coarse} - N_{fine}, X_{coarse} + N_{fine}]$;

$PN_o$ is a known Prime Number (PN) code used to modulate odd-indexed pilots;

$PN_e$ is a known Prime Number (PN) code used to module even-indexed pilots; and, $N_{fine}$ is a number of samples to be searched backwards and forwards around the starting position obtained from a prior synchronization.

26. The apparatus according to claim 23 wherein said MIMO OFDM system includes a plurality of MIMO channels;

each of said MIMO channels has a plurality of sub-carrier channels; and, each of said sub-carrier channels has identical sub-carrier spacing, the apparatus further comprising:

a processor configured to calculate a frequency offset for a multiple of the sub-carrier spacing for each of the plurality of MIMO channels;

said process further configured to calculate a frequency offset for a fraction of the sub-carrier spacing for each of the plurality of MIMO channels;

said processor further configured to calculate a total frequency offset for each of said MIMO channels by summing said frequency offset for a multiple of the sub-carrier spacing for each MIMO channel with the frequency offset for a fraction of the sub-carrier spacing for each MIMO channel; and said processor configured to determine an average frequency offset for said plurality of MIMO channels by averaging the total frequency offset of each MIMO channel.

27. The apparatus according to claim 26 wherein said processor is configured to calculate a shift of the pilot sub-carrier index for each of the preambles in the plurality of data frames.

28. The apparatus according to claim 26 wherein said processor is configured to apply said received signal to the relations:

$$\Lambda_{i,j}(k) = \sum_{l=0}^{N_{tone}} R_{train,j\square\square d\square}(k+l) PN_i^*(k_{min}+l), \text{ where } (i,j=1,2);$$

$l \in [-N_{max}, N_{max}]$;

$Z = \arg \max(\Lambda_{i,j}(k)) - k_{min}$;

$R_{train}$ is a received training symbol;

$K_{min}$ is an index of the first useful sub-carrier;

$PN_i$ are known PN codes used by the transmitters; and $N_{max}$ is a value obtained from the expected maximum frequency offset.

29. The apparatus according to claim 26 wherein said processor is configured to correlate two identical training symbols.

30. The apparatus of claim 29 wherein said processor is configured to calculate a sampling clock offset by correlating said two identical training symbols.

31. The apparatus according to claim 26 wherein said processor is configured to determine the frequency offset of a fraction of the sub-carrier spacing for each of the plurality of MIMO channels by calculating values of and a slope of a curve defined by the relation:

$$\Lambda(l) = \text{angle}(R_{train1}(l) R^*_{train2}(l)),$$

where $R_{train}$ represents training symbols.

32. The apparatus according to claim 30 wherein said processor is configured to calculate said sampling clock offset by calculating a slope of a curve defined by the relation:

$$\Lambda(l) = \text{angle}(R_{train1}(l) R^*_{train2}(l)).$$

33. A method for synchronizing, in a multiple-input/multiple-output (MIMO), orthogonal frequency division multiplexing (OFDM) system, a receiver to a received signal, said method comprising:

receiving a plurality of data signals at a plurality of receivers over a plurality of MIMO channels;

wherein each of said plurality of MIMO channels has a plurality of sub-carrier channels; and, each of said sub-carrier channels has identical sub-carrier spacing, wherein said plurality of data signals each include at least one preamble and at least one symbol, and wherein said at least one symbol includes a plurality of samples;

separating at one of said plurality of receivers one of said plurality of signals from said plurality of signals;

separating at another of said plurality of receivers another of said plurality of signals from said plurality of signals;

respectively determining at said one of and said another of said plurality of receivers a starting position by applying a sliding correlator to the separated signals;

respectively determining at said one of and said another of said plurality of receivers another starting position by traversing said separated signals from said respective starting positions and comparing at least one stored preamble to said separated signals until said at least one stored preamble matches said separated signal in at least one of said one of; and said another of said plurality of receivers.

34. The method according to claim 33 further comprising:

subsequent to matching said at least one stored preamble to said separated signal:

determining a frequency offset for a multiple of the sub-carrier spacing for each of the plurality of MIMO channels;

determining a frequency offset for a fraction of the sub-carrier spacing for each of the plurality of MIMO channels;

determining a total frequency offset for each of said MIMO channels by summing said frequency offset for a multiple of the sub-carrier spacing for each MIMO channel with said frequency offset for a fraction of the sub-carrier spacing for each MIMO channel; and, determining an average frequency offset for said plurality of MIMO channels by averaging the total frequency offset of each MIMO channel.

* * * * *

UNITED STATES PATENT AND TRADEMARK OFFICE
CERTIFICATE OF CORRECTION

PATENT NO. : 7,009,931 B2
APPLICATION NO. : 09/751881
DATED : March 7, 2006
INVENTOR(S) : Jianglei Ma et al.

It is certified that error appears in the above-identified patent and that said Letters Patent is hereby corrected as shown below:

In the Summary of Invention:
Column 2, line 33: delete "synchronization"
insert --synchronizing--

Column 3, line 10: delete "course"
insert --coarse--

In the Detailed Description of the Invention:

Column 7, line 54: delete "$k$ min"
insert -- $k_{min}$ --

Column 7, line 57: insert -- $l \in [-N_{max}, N_{min}]$, and --

Column 7, line 57: delete " $l \in [-N_{max}, N_{min}]$, and "
insert -- $k \in [-N_{max}, N_{min}]$, and --

In the Claims:
Claim 1, Column 8, line 48: delete "received signal; and"

Claim 1, Column 8, line 42: delete "synchronization"
insert --synchronizing--

Claim 1, Column 8, line 47: insert --received signal; and-- after words "correlator algorithm to said"

Claim 2, Column 8, line 56: delete "$\rho/2$"

Claim 2, Column 8, line 59: insert --$\rho/2$-- in front of the words " $\sum_{l=0}^{N_{symbol}-1}$ "

Claim 2, Column 8, line 65: delete " $X_{coarse}^{i}$ "
insert -- $x_{coarse}^{i}$ --

Claim 2, Column 8, line 67: delete " $r^{*}_{t}$ "
insert -- $r_{t}^{i^{*}}$ --

Claim 3, Column 9, line 34: delete " $X_{fine}$ "
insert -- $x_{fine}$ --

UNITED STATES PATENT AND TRADEMARK OFFICE
CERTIFICATE OF CORRECTION

PATENT NO. : 7,009,931 B2
APPLICATION NO. : 09/751881
DATED : March 7, 2006
INVENTOR(S) : Jianglei Ma et al.

It is certified that error appears in the above-identified patent and that said Letters Patent is hereby corrected as shown below:

In the Claims (cont.):

Claim 3, Column 9, line 35: delete "$X \in [X_{coarse} - N_{fine}, X_{coarse} + N_{fine}];$"
insert -- $x \in [x_{coarse} - N_{fine}, x_{coarse} + N_{fine}];$ --

Claim 8, Column 10, line 14: delete "index is determined"
insert --index Z is determined--

Claim 8, Column 10, line 23: delete "$l \in [-N_{max}, N_{max}];$"
insert -- $k \in [-N_{max}, N_{max}];$ --

Claim 8, Column 10, line 26: delete "frequency the"
insert --the frequency--

Claim 8, Column 10, line 28: delete "$K_{min}$"
insert --$k_{min}$--

Claim 13, Column 10, line 53: delete "synchronization"
insert --synchronizing--

Claim 14, Column 11, line 5: delete "$\rho/2$"

Claim 14, Column 11, line 8: insert -- $\rho/2$ -- in front of the words "$\sum_{l=0}^{N_{symbol}-1}$"

Claim 14, Column 11, line 15: delete "$X_{coarse}^{i}$"
insert -- $x_{coarse}^{i}$ --

Claim 14, Column 11, line 17: delete "$r^{*}_{t}$"
insert -- $r_{t}^{i^{*}}$ --

Claim 15, Column 11, line 49: delete "$X_{fine}$"
insert -- $x_{fine}$ --

Claim 15, Column 11, line 50: delete "$X \in [X_{coarse} - N_{fine}, X_{coarse} + N_{fine}];$"
insert -- $x \in [x_{coarse} - N_{fine}, x_{coarse} + N_{fine}];$ --

UNITED STATES PATENT AND TRADEMARK OFFICE
CERTIFICATE OF CORRECTION

PATENT NO. : 7,009,931 B2
APPLICATION NO. : 09/751881
DATED : March 7, 2006
INVENTOR(S) : Jianglei Ma et al.

It is certified that error appears in the above-identified patent and that said Letters Patent is hereby corrected as shown below:

In the Claims (cont.):

Claim 18, Column 12, line 16: delete "sub-carrier index"
insert --sub-carrier index Z--

Claim 18, Column 12, line 21: delete " $PN_l^*$ "

insert -- $PN_i^*$ --

Claim 18, Column 12, line 25: delete " $l \in [-N_{max}, N_{max}]$; "
insert -- $k \in [-N_{max}, N_{max}]$; --

Claim 18, Column 12, line 28: delete "$K_{min}$"
insert --$k_{min}$--

Claim 23, Column 12, line 56: delete "synchronization"
insert --synchronizing--

Claim 24, Column 13, line 18: delete " $X_{coarse}^i$ "
insert -- $x_{coarse}^i$ --

Claim 24, Column 13, line 20: delete "$r^*_t$"

insert -- $r_t^{i^*}$ --

Claim 25, Column 13, line 51: delete " $X_{fine}$ "
insert -- $x_{fine}$ --

Claim 25, Column 13, line 52: delete " $X \in [X_{coarse} - N_{fine}, X_{coarse} + N_{fine}]$; "
insert -- $x \in [x_{coarse} - N_{fine}, x_{coarse} + N_{fine}]$; --

Claim 28, Column 14, line 27: delete " $R_{train\int_d}$ "

insert -- $R_{train}$ --

Claim 28, Column 14, line 30: delete " $l \in [-N_{max}, N_{max}]$; "
insert -- $k \in [-N_{max}, N_{max}]$; --

UNITED STATES PATENT AND TRADEMARK OFFICE
CERTIFICATE OF CORRECTION

PATENT NO.         : 7,009,931 B2
APPLICATION NO.  : 09/751881
DATED              : March 7, 2006
INVENTOR(S)        : Jianglei Ma et al.

It is certified that error appears in the above-identified patent and that said Letters Patent is hereby corrected as shown below:

In the Claims (cont.):

Claim 28, Column 14, line 33:   delete "$K_{min}$"
                                insert --$k_{min}$--

Signed and Sealed this

Fourteenth Day of November, 2006

JON W. DUDAS
*Director of the United States Patent and Trademark Office*